March 18, 1969     A. PEDERSEN     3,433,147
PLANT FOR CONTINUOUS STERILISATION OF MILK
Filed Oct. 2, 1964
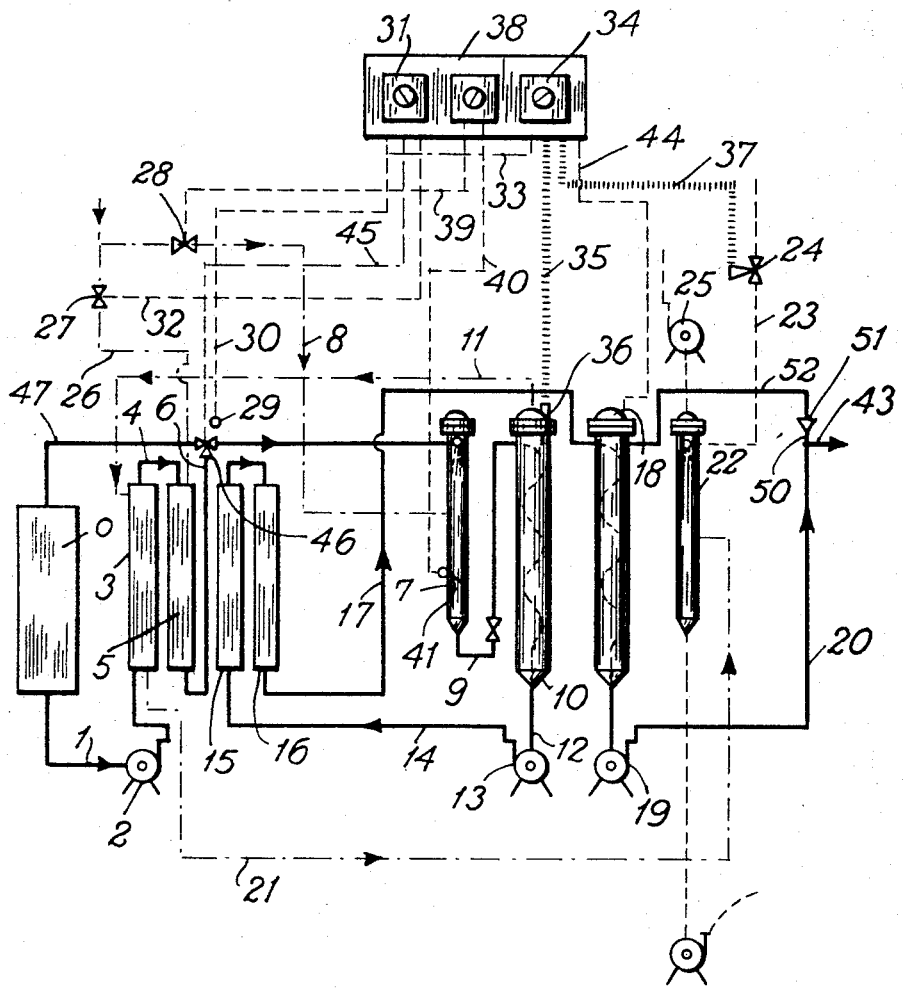
INVENTOR
AKSEL PEDERSEN
BY Mason, Fenwick & Lawrence
ATTORNEYS

United States Patent Office 3,433,147
Patented Mar. 18, 1969

3,433,147
PLANT FOR CONTINUOUS STERILISATION
OF MILK
Aksel Pedersen, Silkeborg, Denmark, assignor to Aktieselskabet Paasch & Silkeborg Maskinfabrikker, Horsens, Denmark
Filed Oct. 2, 1964, Ser. No. 401,113
Claims priority, application Denmark, Oct. 2, 1963, 4,633/63; June 19, 1964, 3,097/64
U.S. Cl. 99—249
Int. Cl. A65b 55/06; A23b 69/10
9 Claims The invention relates to improvements in a plant for continuous sterilisation of milk in which the operation may automatically adapt itself to variations in the discharge of milk from the plant, for example a bottling and packing machine, without any deterioration of the finished product occurring. Thus, it is more particularly aimed at to avoid repeated heat treatment and homogenisation of the milk resulting in a boiled taste and, for example, discolorisation of the milk.

The plant for continuous sterilisation of milk consists according to the invention of a pump for pumping non-sterilised milk from an accumulating tank to a preheater for the milk, a sterilising tank which receives the milk from the preheater and to which pressure steam is fed, an evaporation tank which receives milk and steam from the sterilising tank and in which the milk is separated from the water, a condenser for condensing the vapor from the evaporation tank, an equalising tank which receives the milk from the evaporation tank, a valve member being provided in the pipe between the preheater and the sterilising tank and a return pipe being provided between the valve member and the piping leading to the pump for non-sterilised milk. The said valve member is adapted to cut off the communication between the preheater and the sterilising tank and to establish communication between the preheater and the return pipe.

The invention is also concerned with automatic means for controlling such a plant so that a simplified and improved function is obtained.

The invention is furthermore concerned with a plant in which pressure variations in the discharge pipe from the equalising tank to the bottling and packing machine may be equalised without returning the milk and repeating its heat treatment.

For this purpose the invention relates to a sterilising plant with a pump adapted to force the sterilised milk coming from the equalising tank through a discharge pipe to a bottling and packing machine, and a by-pass pipe connecting the discharge pipe with the equalising tank.

The invention is also concerned with an apparatus for sterilising milk and comprising the following stages: Pumping non-sterilised milk to a sterilising tank, conveying pressure water vapour to the said sterilising tank, conveying the milk and the steam to an evaporation or vacuum tank, separating the milk and condensed water vapour in the evaporation tank, conveying the milk to an equalising tank, pumping the milk from the equalising tank through a discharge pipe, cooling the liquid in the equalising tank and in dependence hereon activating a valve member which by-passes the milk from the preheater to a place in the plant before the pump for non-sterilised milk.

As a result, variations in the milk quantity are equalised without repeated heat treatment.

The invention is furthermore concerned with an apparatus for continuous sterilisation of milk with the following stages: Pumping non-sterilised milk to a sterilising tank, conveying pressure water vapour to the sterilising tank, conveying milk and water vapour into an evaporation or vacuum tank, separating the milk and condensed water vapour in the evaporation tank, conveying the milk to an equalising tank and pumping the milk from the equalising tank through a discharge pipe to a bottling and packing machine, by-passing excessive amounts of milk from the discharge pipe to the equalising tank.

The result obtained is an equalisation of variations in pressure in the pipe to the bottling and packing machine without the necessity of returning milk for renewed heat treatment.

An embodiment of a sterilising plant according to the invention will now be described with reference to the drawing which is a schematic representation of the plant and its pipe connections.

The raw milk in a tank 0 is introduced through the pipe by means of a pump 2 into a preheater 3 and hence through a pipe 4 to another preheater 5 from which the heated milk is conveyed through a pipe 6 into a sterilising tank 7. The milk is fed to a sprinkler device at top of the tank, from which device the milk falls as drops into the bottom of the tank, and pressure water vapour is fed to the milk through a pipe 8 so that the milk is heated to the sterilising temperature, whereas the steam is condensed and leaves the sterilising tank 7 together with the milk through a pipe 9. From the pipe 9 the milk enters an evaporation tank 10 which is kept under vacuum by suction through a pipe 11, and as a result the steam is removed from the milk so that the milk discharged from the lower end of the tank 10 through a pipe 12 has the same content of dry matter as the milk fed to the sterilising tank 7 through the pipe 6.

By means of a pump 13 the milk is forced through a pipe 14 to a cooler 15, 16, from which the milk is led through a pipe 17 to an equalising tank 18, whence it is forced to a discharge pipe 20 by a pump 19, the said pipe 20 being connected with a pipe 43 which leads to a machine for filling milk packages or bottles.

The preheater 3 is heated by the vapour fed to it from the tank 10 through the pipe 11 and after passing the preheater 3 the vapour is passed through a pipe 21 to a condenser tank 22 which is fed with cold water through a pipe 23, the amount of water being regulable by means of a diaphragm valve 24. On condensation of the vapours in the condenser tank 22, a vacuum is established which is maintained by means of a vacuum pump.

Pressure water vapour is supplied to the preheater 5, through a pipe 26, and the amount of steam may be regulated by means of a diaphragm valve 27. The supply of pressure water vapour to the sterilising tank 7 through the pipe 8 may be varied by means of a diaphragm valve 28.

The pipe 6 from the preheater 5 to the sterilising tank 7 is provided with a temperature sensitive feeler or measuring means 29 which is connected through a cable 30 with a controller 31 which, again, is connected through a cable 32 with the diaphragm valve 27 and further through a cable 33 with another controller 23, which through a cable 35 is connected with a temperature feeler or measuring means 36 at the upper end of the evaporation tank 10 and by means of a cable 37 with the diaphragm valve 24.

A third controller 38 is through a cable 39 connected with the diaphragm valve 28 and through a cable 40 with a temperature feeler or measuring means 41 in the sterilising tank 7.

In the preheater 3 the milk is heated to about 70° C. by steam from the vacuum tank 10 and in the preheater 5 further heating to about 75° C. takes place by means of pressure water vapour fed through the pipe 26.

In the sterilising tank 7 the milk flow is divided into fine streams and falls down through the tank in the form of drops, pressure water vapour being simultaneously introduced through the pipe 8 to heat the milk to 145° C.

The hot milk, which is mixed with condensed water vapours, cascades down through the vacuum tank 10, and while the milk is passing through the said tank evaporation and cooling take place.

If the packing machine or the machines connected with the pipe 43 fail for some reason, they will not be able to receive the milk, which will then fill the equalising tank 18 by and by. Inside the said tank there is a feeler or measuring means which through a cable 44 transmits an impulse to the controller 31–34 from which, again, an impulse is transmitted through a cable 45 to a three-way cock 46 inserted in the pipe between the preheater 5 and the sterilising tank 7. The said cock is connected by means of a by-pass pipe 47 with the tank 0.

When the liquid in the tank 18 rises to a predetermined level, the three-way cock 46 will cut off the pipe to the sterilising tank 7 and open the by-pass 47 so that the preheated milk is returned to the tank 0, and as long as the pipe leading to the sterilising tank 7 is closed, the milk will circulate through the pipe 1, the preheaters 3 and 5, the pipe 47 and the tank 0.

The sterilising tanks 7, 10 and 18 will gradually be emptied of milk, but the supply of heat will continue at a reduced rate so that the apparatus are not cooled so much that the sterilisation is destroyed. Steam from the tank 10 will continue flowing through the pipe 11 into the preheater 3 and a heat exchange will therefore take place between the circulating steam and the circulating milk and prevent burning.

The discharge pipe 20 has a branch pipe 50 with a non-return valve 51 which is connected with the equalising tank 18 through a pipe 52. When there is a varying need of milk in the bottling and packing machine connected with the pipe 43, that is, a tendency to varying pressure increases, this will be equalised thereby that the milk which is forced through the pipe 20 by the pump 19 is passed through the non-return valve 51 and the pipe 52 back to the equalising tank 18.

What I claim and desire to secure by Letters Patent is:

1. A plant for continuous sterilisation of milk, consisting of a pump 2 for forcing non-sterilised milk from an accumulating tank 0 to a preheater 3, 5 for the milk, a sterilising tank 7 which receives the milk from the preheater and to which pressure steam is fed, an evaporation tank 10 which receives milk and steam from the sterilising tank 7 and in which the milk is separated from the water, a condenser for condensing the vapor from the evaporation tank, an equalising tank 18 which receives the milk from the evaporation tank 10, a valve member 46 being provided in a pipe between the preheater 3, 5 and the sterilising tank 7, a return pipe 47 being provided between the valve member 46 and the pipe leading to the pump 2 for non-sterilised milk and the valve member 46 is adapted to cut off the communication between the preheater 3, 5 and the sterilising tank 7 and to establish communication between the preheater 3, 5 and the return pipe 47.

2. A sterilising tank as claimed in claim 1, including a measuring means provided on the equalising tank and connected with a controller which controls the said valve member to the return pipe, the said valve member being an automatic three-way cock which at predetermined filling of the equalising tank is activated by the controller so as to cut off communication from the preheater to the sterilising tank and to open communication between the preheater and the return pipe.

3. A plant as claimed in claim 1 including a measuring means 29 provided in the pipe between the preheater 3, 5 and the sterilising tank 7, the said measuring means 29 being connected with a controller 31 which controls a valve 27 provided in a feed pipe 26 for pressure steam to the preheater 3, 5.

4. A sterilising plant as claimed in claim 1 including a measuring means 41 provided in the sterilising tank 7 and connected with a controller 38 which controls a valve member 28 inserted in a feed pipe 8 for pressure steam to the sterilising tank 7.

5. A sterilising plant as claimed in claim 1 including a measuring means 36 provided in the evaporation tank 10 connected with a controller 34 that controls a valve member 24 in a feed pipe 23 for cold water to the cooler 22.

6. A plant as claimed in claim 1 including a preheater divided into two sections, a first section having (a) an inlet for a heating medium communicating with the evaporating tank for receiving steam removed therefrom by suction, and (b) a discharge end for the heating medium communicating with the condenser.

7. A sterilising plant as claimed in claim 1, including a pump which is adapted to force the sterilised milk from the equalising tank through a discharge pipe to a bottling and packing machine, a by-pass pipe connecting the discharge pipe and the equalising tank.

8. A sterilising plant as claimed in claim 7, including a non-return valve provided in the by-pass pipe.

9. A sterilising plant as claimed in claim 7 wherein said pump 19 is connected to the bottom of the equalising tank 18 to force sterilised milk to the bottling and packing machine and said by-pass pipe 52 is connected to the top of the equalising tank.

References Cited

UNITED STATES PATENTS

| | | | |
|---|---|---|---|
| 2,078,841 | 4/1937 | Fauth | 99—61 |
| 2,428,044 | 9/1947 | Sharp | 99—273 |
| 3,010,832 | 11/1961 | Dahlstedt | 99—249 X |
| 3,231,009 | 1/1966 | Loliger | 99—251 X |

ROBERT W. JENKINS, *Primary Examiner.*

U.S. Cl. X.R.

99—212; 333—7, 21, 98; 343—786